United States Patent [19]

Horn et al.

[11] 3,970,634

[45] July 20, 1976

[54] POLYHEXAMETHYLENE ADIPAMIDE MOLDING COMPOSITIONS NOT SUBJECT TO DISCOLORATION WHEN CONDITIONED WITH WATER

[75] Inventors: Peter Horn, Ludwigshafen; Claus Cordes, Weisenheim; Richard Pflueger, Ludwigshafen, all of Germany

[73] Assignee: BASF Aktiengesellschaft, Ludwigshafen (Rhine), Germany

[22] Filed: May 12, 1975

[21] Appl. No.: 576,355

[30] Foreign Application Priority Data
June 14, 1974 Germany.................... 2428759

[52] U.S. Cl. .................... 260/45.7 S; 260/78 SC; 260/78 S; 260/78 R; 260/45.95 H
[51] Int. Cl.² .......................................... C08J 3/20
[58] Field of Search .......... 260/45.7 S, 78 SC, 78 S, 260/45.95, 78 R

[56] References Cited
UNITED STATES PATENTS
3,023,074   2/1962   Herschler............................ 8/130.1

FOREIGN PATENTS OR APPLICATIONS
1,141,352   1/1969   United Kingdom

*Primary Examiner*—V.P. Hoke
*Attorney, Agent, or Firm*—Johnston, Keil, Thompson & Shurtleff

[57] ABSTRACT

Molding compositions based on polyhexamethylene adipamide and containing phenolic additives and, to obviate discoloration on conditioning, from 0.001 to 0.5% by weight, based on polyhexamethylene adipamide, of a compound having a chain transfer constant for styrene at 100°C of more than 1.5. The preferred chain transfer agent used is n-dodecylmercaptan.

4 Claims, No Drawings

POLYHEXAMETHYLENE ADIPAMIDE MOLDING COMPOSITIONS NOT SUBJECT TO DISCOLORATION WHEN CONDITIONED WITH WATER

It has been known for many years to stabilize polyamides against thermooxidative damage and attack by ultraviolet light by means of phenolic antioxidants (cf. Kunststoffhandbuch, Polyamide, vol. VI, 1966, published by Carl Hanser Verlag, Munchen, pp. 240 and 241). However, this process suffers from the drawback that the polyhexamethylene adipamide molding compositions thus stabilized tend to discolor toward red or reddish brown when conditioned with water or steam. Conditioning of polyhexamethylene adipamide is necessary in order to achieve the degree of toughness required in industry.

It is an object of the present invention to prevent said undesirable discolaration of polyhexamethylene adipamide toward red or reddish brown as has hitherto occurred on conditioning thereof.

According to the invention, this object is surprisingly achieved by adding to the molten polyhexamethylene adipamide from 0.001 to 0.5%, by weight of the polyhexamethylene adipamide of a compound whose chain transfer constant for styrene at 100°C is greater than 1.5 and is preferably from 8 to 30. The addition of such compounds in accordance with the invention effectively prevents the red to brown discoloration of polyhexamethylene adipamide when conditioned with water without impairing the action of the phenolic antioxidants added.

A suitable chain transfer agent to be added according to the present invention is, for example, n-dodecylmercaptan. Examples of other chain transfer agents are t.-butyl dodecylmercaptan and those described in Polymer Handbook, I. Brandrup and E. H. Immergut, Interscience Publishers, New York, 1966, Tables II - 128 to II - 133.

The molding compositions of the invention may contain, as phenolic antioxidants, any of the compounds of this kind which are conventionally used in polyhexamethylene adipamide. Examples thereof are 2,6-di-t.-butyl-p-cresol and N,N'-bis-[3-(3,5-di-t.-butyl-4-hydroxyphenyl)-propionyl]-hexamethylenediamine. Such phenolic antioxidants are used in conventional amounts, for example in amounts of from 0.1 to 0.8%, by weight of the polyhexamethylene adipamide.

The chain transfer agents to be added in accordance with the present invention are fed to the molten polyhexamethylene adipamide on completion of the polycondensation of the latter.

The present invention is illustrated below with reference to an Example, in which the parts are by weight and the percentages are by weight of the polymer product. Color measurements were carried out on granulated polyhexamethylene adipamide in accordance with DIN 5033.

The measurements were run with a recording spectrophotometer DMG 25 by Zeiss against $BaSO_4 = 100\%$, gloss included, using standard light source C/2° observer.

The test samples were placed in black powder bowls to a height of 15 mm, three such filled bowls being tested for each sample. In the case of the luminance factor Y the margin or error is ± 0.3 and in the case of the color coordinates x and y it is $\pm 2 \times 10^{-4}$.

The perforated impact resistance was measured on standard test specimens according to DIN 53,453, this being regarded as a characteristic mechanical property for testing the aging behavior. The standard specimens measuring $4 \times 6 \times 50$ mm were provided with a 3-mm hole at the center and were held in air at 140°C for 30 days. After 3, 10, 20 and 30 days, 10 specimens were taken from each sample and the perforated impact resistance was determined as described in "Kunststoffe" 57 (1967), pp. 825 to 828.

EXAMPLE 1

200 parts of polyhexamethylene adipamide granules (K value 73.1) were mechanically blended with 1 part of 2,6-di-t.-butyl-p-cresol and the mixture was melted in a twin-shaft kneader heated at 270°C and then extruded therefrom. The extrudate was granulated, dried and injection molded to standard specimens conforming to DIN 53,453. The granules were subjected to conditioning (3 days at 80°C using distilled water), and their color was measured according to DIN 5033 before and after conditioning. The standard specimens were used for determining the perforated impact resistance.

EXAMPLE 2

200 parts of polyhexamethylene adipamide granules (K value 73.1) were mechanically blended with 1 part of 2,6-di-t.-butyl-p-cresol and 0.05 part of n-dodecylmercaptan. Further treatment was carried out as described in Example 1.

TABLE 1

Colorimetric data of Examples 1 and 2

| Granules | Untreated Color coordinates x, y Luminance factor Y | | | | Conditioned (3 days, 80°C, H₂O) Color coordinates x, y Luminance factor Y | | | |
|---|---|---|---|---|---|---|---|---|
| | x | y | Y | Color | x | y | Y | Color |
| Example 1 | 0.3324 | 0.3447 | 51.9 | pale yellow | 0.3745 | 0.3531 | 40.4 | marked reddish brown |
| Example 2 | 0.3342 | 0.3419 | 57.1 | pale yellow | 0.3498 | 0.3526 | 49.9 | pale yellow |

TABLE 2

Stabilization of polyamide-6,6 of Examples 1 and 2

| Molding composition of | Perforated impact resistance in cmkg/cm² after | | | | |
|---|---|---|---|---|---|
| | 0 | 3 | 10 | 20 | 30 days |
| Example 1 | 60 | 15.7 | 3.8 | 1.4 | 0.8 |
| Example 2 | 60.8 | 16.0 | 4.1 | 0.8 | 0.7 |

We claim:
1. A molding composition comprising:
   1. polyhexamethylene adipamide,
   2. a phenolic antioxidant, and
   3. from 0.001 to 0.5% by weight based on the weight of said polyhexamethylene adipamide of a chain transfer agent having a chain transfer constant for styrene at 100°C which is greater than 1.5.

2. A molding composition as set forth in claim 1 wherein said chain transfer agent has a chain transfer constant for styrene at 100°C of from about 8–30.

3. The molding composition as set forth in claim 1 wherein said chain transfer agent is n-dodecylmercaptan.

4. A process for the manufacture of molding compositions as set forth in claim 1, wherein the chain transfer agent is added to the molten polyhexamethylene adipamide following polycondensation thereof.

* * * * *